Oct. 14, 1924.  
W. L. DULANY  
1,511,511  
FASTENING MEANS FOR DEMOUNTABLE AUTO RIMS  
Filed March 22, 1923
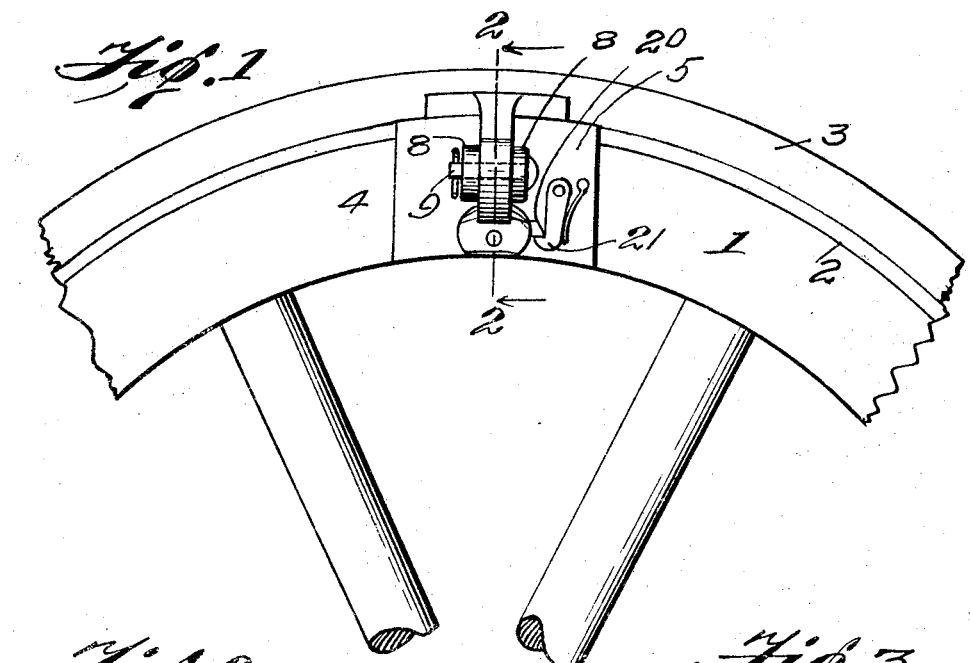
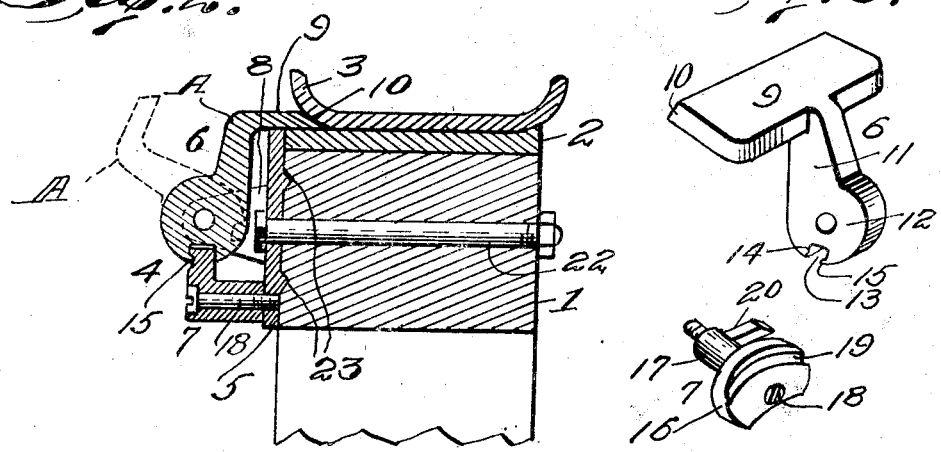
INVENTOR.  
W. L. Dulany,  
BY  
ATTORNEYS.

Patented Oct. 14, 1924.

1,511,511

UNITED STATES PATENT OFFICE.

WASHINGTON L. DULANY, OF WOODSTOCK, NEW YORK.

FASTENING MEANS FOR DEMOUNTABLE AUTO RIMS.

Application filed March 22, 1923. Serial No. 626,860.

*To all whom it may concern:*

Be it known that I, WASHINGTON L. DULANY, a citizen of the United States, residing at Woodstock, in the county of Ulster and State of New York, have invented certain new and useful Improvements in Fastening Means for Demountable Auto Rims, of which the following is a specification, reference being had therein to the accompanying drawings.

This invention relates to a fastening means for demountable automobile and motor vehicle tires, and the object of the invention is the construction of a simple and efficient device for holding the rim, carrying the tire, on the felly or wheel, and which device can be quickly and easily operated to release the rim.

With these and other objects in view, my invention comprises certain novel combinations, constructions and arrangements of parts as will be hereinafter described, illustrated in the accompanying drawings, and more particularly pointed out in the appended claims.

In the drawings:

Figure 1 is fragmentary view in side elevation of a wheel showing my device in elevation.

Figure 2 is a sectional view, taken on line 2—2, Fig. 1, and looking in the direction of the arrows.

Figure 3 is a perspective view of the pivotally mounted rim-engaging device.

Figure 4 is a perspective view of the cam-locking device.

Referring to the drawings by numerals, 1 designates the felly of the wheel upon which is mounted the usual metal band 2; on the band 2 is the usual rim 3 for carrying or supporting the tire.

To keep the rim 3 upon the band 2, I have provided a plurality of fastening devices 4, but it will only be necessary to specifically describe one of these devices, as they are similar or duplicate in construction around an entire wheel of any ordinary structure.

The fastening device 4 includes the plate 5, rim-engaging device 6 and the cam-locking device 7.

On the plate 5 is formed a pair of parallel lugs 8, on which lugs 8, by means of bolt 9, is pivotally mounted the rim-engaging device 6.

The rim-engaging device 6 comprises a flat body 9 that has an inner, bevelled edge 10 fitting snugly against the side of rim 3, Fig. 2. Depending from the outer edge of body 9 is arm 11, and on the lower end of arm 11 is head 12. Formed in the lower edge of head 12 is groove 13 which is provided with a rear straight wall 14. Extending inwardly into the groove 13 is hook 15.

The cam-locking device 7 comprises a body 16, extending from which body is stem 17. A screw 18 extends through the body and is threaded into plate 5 for securing the cam-locking device in an operative position with respect to the rim-engaging device 6, Figs. 1 and 2. Formed in the outer face of body 16 is a curved groove 19 into which extends hook 15 of head 12 when the parts are in a locking position; the straight wall 14 of groove 13 bears against the rear face of body 16. A straight catch 20 is integral with the stem 17 and normally engaging this catch is spring-pressed latch 21, Fig. 1, for holding the parts in a locking position. By moving the spring-pressed latch 21 outwardly, at its lower end, catch 20 will be disengaged, whereupon the cam-locking device can be rotated on screw 18 to cause the same to disengage head 12, whereupon the flat body 9 can be moved outwardly or away from the rim as at A, Fig. 2, for permitting the rim 3 to be removed from the wheel.

The plate 5 is fastened to the felly 1 by means of a bolt 22, and to assist in holding the plate secure upon the felly I have provided two spurs 23 that slightly enter the felly.

The operation of my device is very simple, and yet it forms a secure and positive fastening means for retaining the rim upon the felly and band, and it is optional with the manufacturer as to the number of the fastening devices used upon any wheel.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. A rim securing device comprising a plate adapted to be secured to the side of a wheel felloe, a rim engaging element having a flat body provided with a bevelled rim engaging free edge, an arm extending from said body and provided with a head pivotally connected with said plate and notch leading from its periphery and having one wall provided with a hook forming extension, and a locking device for securing the rim engaging element in a rim securing position and having a stem rotatably connected with said plate, and a head eccentrically carried by said stem and moving into and out of the notch formed in the head of the rim engaging element when the locking device is turned and having a curved groove in one face to receive the hook extension.

2. In a device of the class described, the combination of a plate provided with a pair of lugs, a rim-engaging device pivotally mounted between said lugs, said rim-engaging device having a flat body provided with a bevelled edge, said body provided with a depending arm at its outer edge, a head formed on the lower end of said arm, said head provided in its lower edge with a straight transverse screw having a straight inner wall and a hook extending inwardly from its outer wall, a cam-locking device comprising a body and an integral stem under said rim-engaging device, a screw extending through said body and stem and into said plate, a catch integral with said stem, said body of said cam-locking device provided with a curved groove in its outer face adapted to receive said hook, and a spring-pressed latch on said plate and normally engaging said catch for holding the parts in a locked position, substantially as shown and described.

In testimony whereof I hereunto affix my signature.

WASHINGTON L. DULANY. [L. S.]